J. WEICHHART.
Lawn-Rake.
No. 210,650. Patented Dec. 10, 1878.
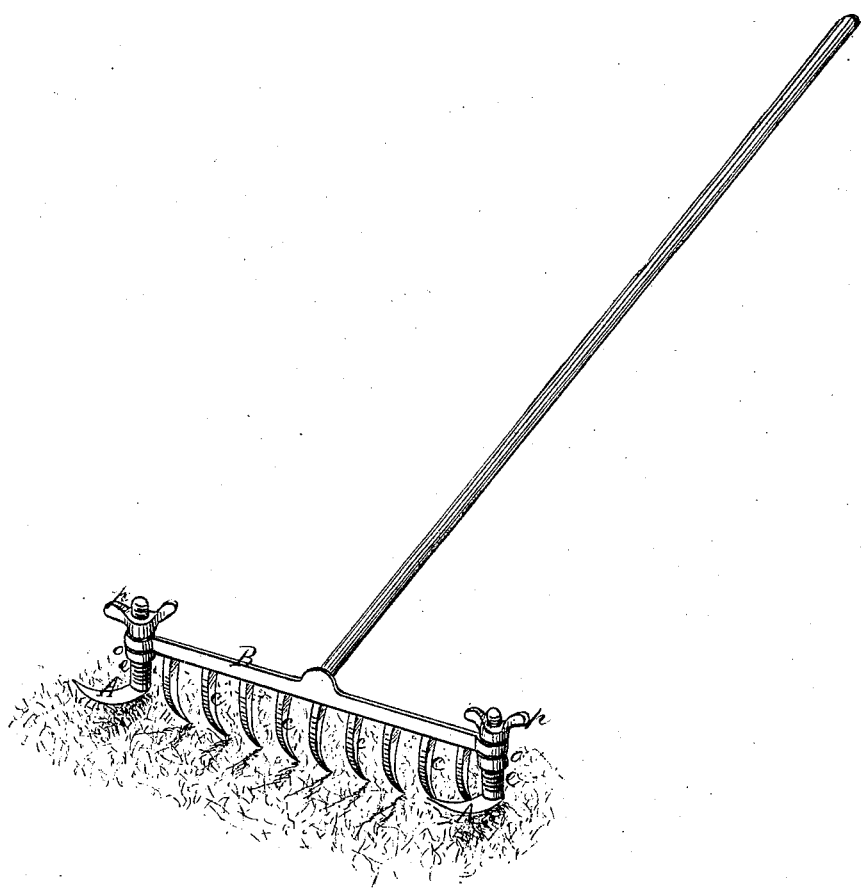
Witnesses
Will B. Schwartz
W. H. Clark
Inventor
John Weichhart
by Jno. L. Boone
Atty

UNITED STATES PATENT OFFICE.

JOHN WEICHHART, OF SAN FRANCISCO, CALIFORNIA.

IMPROVEMENT IN LAWN-RAKES.

Specification forming part of Letters Patent No. 210,650, dated December 10, 1878; application filed March 20, 1878.

*To all whom it may concern:*

Be it known that I, JOHN WEICHHART, of the city and county of San Francisco, and State of California, have invented certain new and useful Improvements in Lawn-Rakes; and I do hereby declare the following to be a full, clear, and exact description of the same, reference being had to the accompanying drawing, which represents a perspective view of my invention.

Previous to my invention the hand-rakes generally employed for raking together the leaves or cut grass on lawns or other similar places were accompanied by one great objection, that of the points of the teeth penetrating the soil and tearing the sod or growing roots of grass during the process of raking. To this class of rakes my invention relates, and has for its object to remedy the above evil by providing an attachment to the rake that will effectually prevent the points of the teeth from penetrating the soil, and thereby preserve the sod or growing roots of grass from being destroyed or injured.

The invention therefore consists in providing the rake with horizontal shoes, located above the point or lower part of the teeth and resting upon the cut grass or leaves, allowing the teeth to project into the cut grass or leaves sufficiently to rake them together without disturbing the soil or sod.

In the accompanying drawing, A represents the shoes, located at each end of the rake-head B. These shoes, it will be noticed, are arranged above the points of the teeth; and in the process of raking they rest upon the cut grass or leaves above the level of the soil, the teeth or points of the rake projecting sufficiently below the shoes to gather the grass or leaves, but not to penetrate the soil or sod, thereby preserving it from being torn or otherwise injured, which was the great objection to the hand or lawn rakes previously used, as they would invariably dig or tear the ground or sod. The shoes A are made adjustable, so that the amount of penetration of the rake-teeth into the grass or leaves can be regulated by raising or lowering the shoes, as required, by the depth of cut grass or leaves upon the ground.

The rake-head B extends beyond the teeth at each end and has a hole through it. Each shoe A, which is preferably convex upon its under side, is provided with a vertical screw-shank, *e*, which passes up through the hole in the extended end of the rake-head. A nut, *o*, is placed upon the screw-threaded portion of the shank *e*, and bears against the under side of the rake-head.

A thumb-nut, *p*, is secured upon the upper end of the screw-shank, and when the shoe is adjusted to the proper height the thumb-nut is screwed down upon the upper side of the rake-head, so as to bind the extension of the rake-head between the two nuts, and thus fix the shoe firmly in position. The position of the shoe can be set at any desired height above the points of the rake-teeth by simply slackening the upper nut, *p*, and setting the lower nut, *o*, to the required point, and then tightening the upper nut again, as before described. These means of adjusting the shoes are not only simple and effective, but are also considered valuable from the fact that the shoe and shank are not liable to work loose and twist or turn; and as there are no slots or openings in or through the shank, the full strength of the metal composing the shank is preserved, and therefore less liable to become broken.

The teeth *c* of the rake are made gradually tapering from their bases to their points, and are also made thinner at and along their front edges than their backs, thus giving a knife or cutting edge to separate or cut the grass as the teeth move through it, thereby preventing the grass from clinging to them and clogging the rake.

Having now fully described my invention, what I claim as new, and desire to secure by Letters Patent, is—

1. A hand or lawn rake having a stationary rake-head, and provided with horizontal shoes arranged at each end thereof and above the points of the rake-teeth, to rest upon the cut grass or leaves during the process of raking and prevent the teeth from penetrating the soil or sod and tearing or injuring the same, substantially as set forth.

2. A hand or lawn rake provided with horizontal shoes capable of vertical adjustment to bring said shoes to the desired height above the points of the rake-teeth, substantially as and for the purpose specified.

3. A hand or lawn rake having teeth formed with knife or cutting edges upon their inner faces, and horizontal shoes secured to the extended ends of the rake-head and disposed above the points of the teeth, substantially as and for the purpose set forth.

4. A hand or lawn rake having teeth formed with knife or cutting edges, and provided with horizontal shoes formed with vertical shanks passing up through openings in the extended ends of the rake-head and vertically adjustable therein, substantially as and for the purpose specified.

In witness whereof I have hereunto set my hand and seal.

JOHN WEICHHART. [L. S.]

Witnesses:
W. F. CLARK,
WILL B. SCHWARTZ.